United States Patent
Lee et al.

(10) Patent No.: US 9,563,357 B2
(45) Date of Patent: *Feb. 7, 2017

(54) APPARATUS AND METHOD FOR CONTROLLING KEY INPUT

(71) Applicant: Samsung Electronics Co., Ltd., Gyeonggi-do (KR)

(72) Inventors: Dong-Jun Lee, Gyeongsangbuk-do (KR); Chul-Hui Park, Gyeongsangbuk-do (KR); In-Ho Lee, Gyeongsangbuk-do (KR); Hye-Soon Jeong, Gyeongsangbuk-do (KR); Sun-Yeal Hong, Gyeongsangbuk-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/082,243

(22) Filed: Mar. 28, 2016

(65) Prior Publication Data

US 2016/0210043 A1 Jul. 21, 2016

Related U.S. Application Data

(63) Continuation of application No. 14/013,556, filed on Aug. 29, 2013, now Pat. No. 9,329,698.

(30) Foreign Application Priority Data

Aug. 29, 2012 (KR) .................. 10-2012-0095055

(51) Int. Cl.
  *G06F 3/0488* (2013.01)
  *G06F 3/02* (2006.01)
  (Continued)

(52) U.S. Cl.
  CPC .......... *G06F 3/04886* (2013.01); *G06F 3/017* (2013.01); *G06F 3/02* (2013.01); *G06F 3/0233* (2013.01);
  (Continued)

(58) Field of Classification Search
  CPC ............ G06F 3/02; G06F 3/041–3/047; G06F 3/0233; G06F 3/04886; G06F 2203/04803; G06F 3/017
  (Continued)

(56) References Cited

U.S. PATENT DOCUMENTS

| | | |
|---|---|---|
| 5,764,794 A | 6/1998 | Perlin |
| 5,798,760 A | 8/1998 | Vayda et al. |

(Continued)

FOREIGN PATENT DOCUMENTS

| | | |
|---|---|---|
| KR | 10-2010-0000479 A | 1/2010 |
| KR | 10-0993508 B1 | 11/2010 |

*Primary Examiner* — Dmitriy Bolotin
(74) *Attorney, Agent, or Firm* — Cha & Reiter, LLC

(57) ABSTRACT

A key input control apparatus includes a gesture recognizing unit which detects whether or not an input of a touch event generated on a screen corresponds to a predetermined gesture. A gesture area identifying unit which identifies a predetermined area where the input of the touch event corresponding to the predetermined gesture is generated. A key input recognizing unit which recognizes a hardware key allotted to the predetermined area and performs an operation corresponding to an input of the recognized hardware key.

17 Claims, 18 Drawing Sheets

(51) Int. Cl.
*G06F 3/041* (2006.01)
*G06F 3/023* (2006.01)
*G06F 3/01* (2006.01)

(52) U.S. Cl.
CPC ............ *G06F 3/041* (2013.01); *G06F 3/0416* (2013.01); *G06F 2203/04803* (2013.01)

(58) Field of Classification Search
USPC ................. 345/156–184; 715/863, 764–862
See application file for complete search history.

(56) References Cited

U.S. PATENT DOCUMENTS

| | | |
|---|---|---|
| 6,031,525 A | 2/2000 | Perlin |
| 6,967,642 B2 | 11/2005 | SanGiovanni |
| 7,215,321 B2 | 5/2007 | SanGiovanni |
| 7,461,355 B2 | 12/2008 | SanGiovanni |
| 7,705,833 B2 | 4/2010 | Kim |
| 8,896,562 B2 | 11/2014 | Horiguchi |
| 2002/0101441 A1 | 8/2002 | SanGiovanni |
| 2002/0101458 A1 | 8/2002 | SanGiovanni |
| 2007/0079239 A1 | 4/2007 | Ghassabian |
| 2007/0216653 A1 | 9/2007 | Chang |
| 2007/0274591 A1 | 11/2007 | Chang |
| 2008/0052945 A1 | 3/2008 | Matas et al. |
| 2010/0053104 A1 | 3/2010 | Ahn |
| 2012/0038572 A1 | 2/2012 | Kim et al. |
| 2012/0071212 A1 | 3/2012 | Endo et al. |
| 2012/0192108 A1 | 7/2012 | Kolb |
| 2013/0016103 A1 | 1/2013 | Gossweiler, III et al. |
| 2013/0044341 A1* | 2/2013 | Uchino ................. G06F 3/0486 358/1.13 |
| 2013/0201155 A1 | 8/2013 | Wu et al. |
| 2014/0026098 A1 | 1/2014 | Gilman |
| 2014/0181722 A1* | 6/2014 | Kim ..................... G06F 3/0233 715/773 |

\* cited by examiner

APPARATUS AND METHOD FOR CONTROLLING KEY INPUT

CROSS REFERENCE TO RELATED APPLICATIONS

This is a Continuation application of U.S. patent application Ser. No. 14/013,556 filed on Aug. 29, 2013 which claims the priority under 35 U.S.C. §119(a) from Korean Application Serial No. 10-2012-0095055, which was filed in the Korean Intellectual Property Office on Aug. 29, 2012, the entire content of which is hereby incorporated by reference.

BACKGROUND

1. Field of the Invention

The present disclosure relates to a portable terminal, and more particularly, to an apparatus and a method for controlling a key input of a portable terminal.

2. Description of the Related Art

In recent years, various services and additional functions available for mobile devices have been steadfastly grown. In order to satisfy increasing demands of mobile users, diverse applications have been developed.

Basic applications are provided by the manufacturers can be downloaded and stored in the mobile device. To this end, tens of thousands to hundreds of thousands of applications are currently being provided free of charge or with a fee to the portable terminal according to the products.

In recent years, at least dozens to hundreds of applications are typically stored in a portable terminal such as a smart phone and a tablet PC. These devices implemented with a touch screen are provided with shortcut keys for executing the respective applications displayed in an icon form on the touch screen. Thus, the users can execute a desired application by touching any one of the icons displayed on the touch screen.

Meanwhile, a portable terminal having a touch screen as described above may further include separate hardware keys as an input means. However, in operation, although the users can perform a touch input on the touch screen using a touch input medium such as a stylus pen, it is still difficult to activate or press the hardware keys using the stylus pen or other input object.

SUMMARY

Accordingly, the present invention has been made at least in part in view of the above-mentioned problems and provides additional advantages, by providing a method and an apparatus in which, the input of hardware keys can be intuitively performed without activating or pressing the hardware keys included in a portable terminal.

Another aspect of the present invention is to provide a method and an apparatus in which the hardware keys are activated even if the user's body (for example, fingers) or the touchable input medium is not moved into an area where the hardware keys are provided for activation.

Another aspect of the present invention is to provide a key input control apparatus which includes: a gesture recognizing unit which detects whether or not an input of a touch event generated on a screen corresponds to a predetermined gesture; a gesture area identifying unit which identifies a predetermined area where the input of the touch event corresponding to the predetermined gesture is generated; and a key input recognizing unit which recognizes a hardware key assigned to the predetermined area, and performs an operation corresponding to an input of the recognized hardware key.

Another aspect of the present invention is to provide a key input control method which includes: detecting whether or not an input of a touch event generated on a screen of the portable terminal corresponds to a predetermined gesture; identifying a predetermined area where the input of the touch event corresponding to the predetermined gesture is generated; and recognizing a hardware key assigned to the identified predetermined area, and performing an operation corresponding to an input of the recognized hardware key.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION

Figure 1:
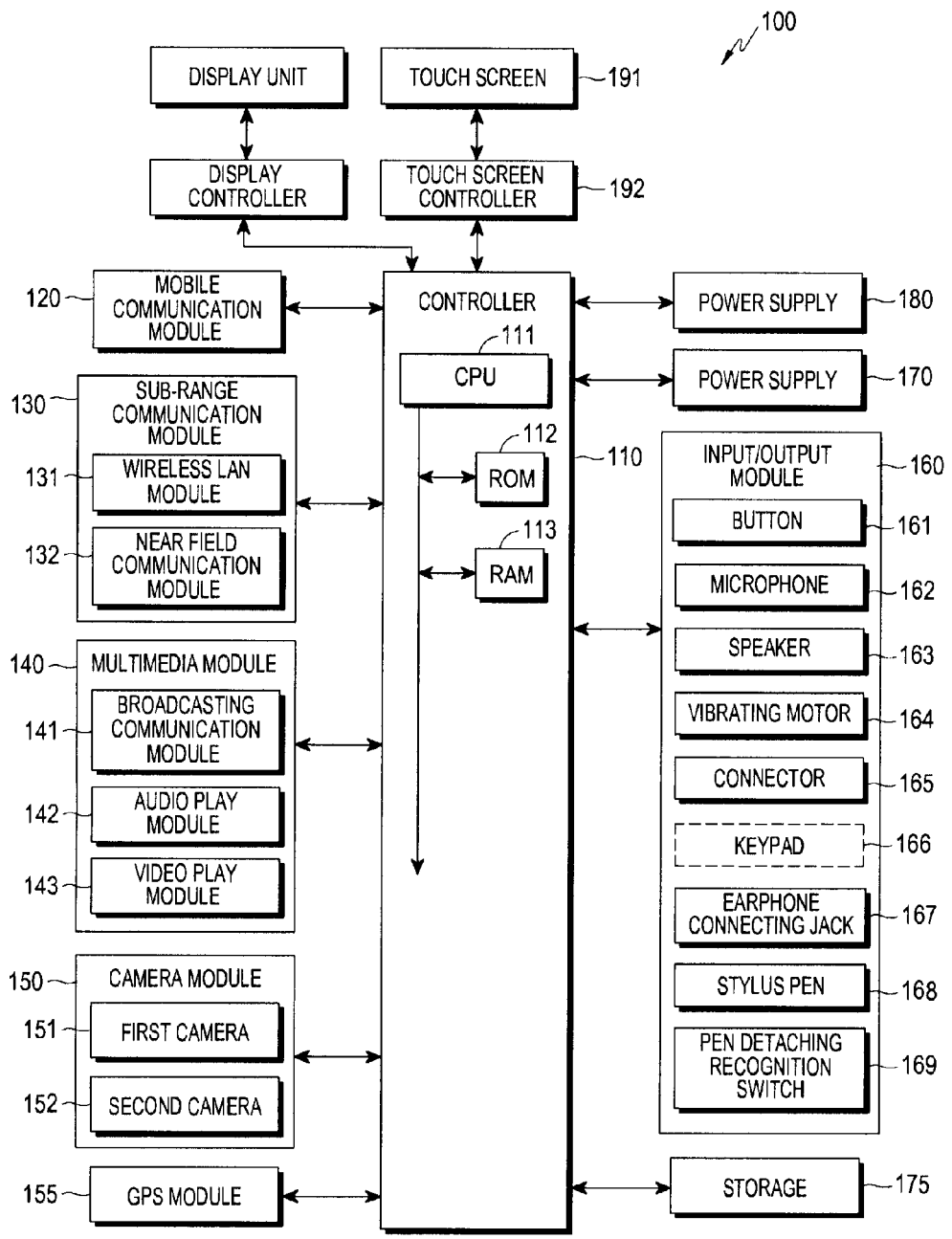
FIG. 1 is a block diagram showing a portable terminal according to an embodiment of the present invention.

Hereinafter, exemplary embodiments according to the present invention will be described in detail with reference to the accompanying drawings. However, the present invention is not restricted by the exemplary embodiments, and is not limited to the exemplary embodiments. Identical reference numerals shown in the drawings denote a member performing a substantially identical function. It is to be understood that the singular forms "a," "an," and "the" include plural referents unless the context clearly dictates otherwise. Thus, for example, reference to "a component surface" includes reference to one or more of such surfaces. Further, although the terms including an ordinal number such as first, second, etc. can be used for describing various elements, the elements are not restricted by the terms. The terms are only used to distinguish one element from another element. For example, a first element could be termed a second element, and similarly, a second element could be also termed a first element without departing from the scope of the present invention. The terms used in the present application are only used to describe specific embodiments, and are not intended to limit the present invention. Singular forms are intended to include plural forms unless the context clearly indicates otherwise.

FIG. 1 is a block diagram showing a portable terminal according to an embodiment of the present invention.

Referring to FIG. 1, an electronic device 100 may be communicatively coupled with an external device (not shown) by using an external device connector such as a sub-communication module 130, a connector 165, and an earphone connecting jack 167. The external device may include various devices such as an earphone, an external speaker, a universal serial bus (USB) memory, a charger, a cradle/dock, a DMB antenna, a mobile payment related device, a health care device (a blood sugar measuring device), a game machine, and a vehicle navigation device, which may be detachably connected to the electronic device in a wired manner. Moreover, the external device may include a Bluetooth communication device, a near field communication (NFC) device, a Wi-Fi Direct communication device, and a wireless access point (AP), which may be connected to the apparatus 100 in a wireless manner through near field communication. Furthermore, the external device may include other devices such as a cell phone, a smart phone, a tablet PC, a desktop PC, and a server.

Referring to FIG. 1, the electronic device 100 may include a touch screen 191, a touch screen controller 192, a display unit 193, and a display controller 194. Moreover, the electronic device 100 may include a controller 110, a mobile communication module 120, a sub-communication module 130, a multimedia module 140, a camera module 150, a GPS module 155, an input/output module 160, a sensor module 170, a storage unit 175, a power supply unit 180, and an accessory interface 197. The sub-communication module 130 may include at least one of a wireless LAN module 131 and a near field communication module 132, and the multimedia module 140 may include at least one of a broadcasting communication module 141, an audio play module 142, and a video play module 143. The camera module 150 may include at least one of a first camera 151 and a second camera 152, and the input/output module 160 includes at least one of a button 161, a microphone 162, a speaker 163, a vibratory motor 164, a connector 165, and a keypad 166. In addition, the input/output module 160 may include a stylus pen 168, and a pen detaching recognition switch 169.

The controller 110 may include a CPU 111, a ROM 112 in which control programs for control of the electronic device 100 are stored, and a RAM 113 which stores signals or data input from the outside of the electronic device 100, or is used as a memory area for operations performed in the apparatus 100. The CPU 111, the ROM 112, and the RAM 113 may be connected with each other through an internal bus.

The controller 110 may control the mobile communication module 120, the sub-communication module 130, the multimedia module 140, the camera module 150, the GPS module 155, the input/output module 160, the sensor module 170, the storage unit 175, the power supply unit 180, the touch screen 191, the touch screen controller 192, the display unit 193, and the display controller 194.

Moreover, the controller 110 may be formed of a single core, a dual core, a triple core, or a quad core.

The mobile communication module 120 allows the electronic device 100 to be connected with the external device through mobile communication by using at least one antenna (not shown) or a plurality of antennas (not shown) under the control of the controller 110. The mobile communication module 120 transmits/receives wireless signals for a voice call, a video call, a short message service (SMS), or a multimedia message service (MMS) to/from a cell phone (not shown), a smart phone (not shown), a tablet PC (not shown), or other devices (not shown), having phone numbers which are input to the electronic device 100.

The sub-communication module 130 may include at least one of the wireless LAN module 131, and the near field communication module 132. For example, the sub-communication module 130 may include only the wireless LAN module 131, only the near field communication module 132, or both the wireless LAN module 131 and the near field communication module 132.

The wireless LAN module 131 may be connected to the internet, at the place where the wireless access point (AP) (not shown) is installed, under the control of the controller 100. The wireless LAN module 131 supports a wireless LAN protocol (IEEE802.11x) of the Institute of Electrical and Electronics Engineers (IEEE). The wireless LAN module 131 may drive a Wi-Fi positioning system (WPS) for identifying positional information of a terminal including the wireless LAN module 131, by using the positional information which the wireless access point (AP) in wireless connection with the wireless LAN module 131 provides.

The near field communication module 132 may perform near field communication in a wireless manner between the electronic device 100 and an image forming device (not shown) under the control of the controller 110. The near field communication method may include Bluetooth, infrared data association (IrDA), Wi-Fi direct communication, and near field communication (NFC).

The electronic device 100 may include at least one of the mobile communication module 120, the wireless LAN module 131, and the near field communication module 132 according to the performance thereof. For example, the electronic device 100 may include combinations of the mobile communication module 120, the wireless LAN module 131, and the near field communication module 132 according to the performance thereof.

The multimedia module 140 may include the broadcasting communication module 141, the audio play module 142, or the video play module 143. The broadcasting communication module 141 may receive a broadcasting signal (for example, a TV broadcasting signal, a radio broadcasting signal, or a data broadcasting signal), and broadcasting additional information (for example, electric program guide (EPS), or electric service guide (ESG)), which have been transmitted from a broadcasting station through a broadcasting communication antenna, under the control of the controller 110. The audio play module 142 may play digital audio files (for example, files with an extension such as mp3, wma, ogg, and way) which are stored or received under the control of the controller 110. The video play module 143 play digital video files (for example, files with an extension such as mpeg, mpg, mp4, avi, mov, and mkv) which are stored or received under the control of the controller 110. The video play module 143 may play the digital audio files.

The multimedia module 140 may include the audio play module 142, and the video play module 143, except for the broadcasting communication module 141. Moreover, the audio play module 142 or the video play module 143 of the multimedia module 140 may be included in the controller 110.

The camera module 150 may include at least one of the first camera 151 and the second camera 152 for photographing still images and videos under the control of the controller 110. Moreover, the first camera 151 and the second camera 152 may include a sub-light source (for example, a flash (not shown)) for providing a needed quantity of light for the photography. The first camera 151 may be disposed on a front surface of the apparatus 100, and the second camera 152 may be disposed on a rear surface of the apparatus 100. Otherwise, the first camera 151 and the second camera 152 may be disposed adjacent to each other (for example, an interval between the first camera 151 and the second camera 152 is longer than a distance of 1 cm, and smaller than a distance of 8 cm) to photograph three dimensional still images or three dimensional videos.

The GPS module 155 may receive electric waves from a plurality of GPS satellites (not shown) in earth orbit, and may calculate a location of the electronic device 100 by using the arrival times of the electric waves from the GPS satellites (not shown) to the electronic device 100.

The input/output module 160 may include at least one of a plurality of buttons 161, the microphone 162, the speaker 163, the vibratory motor 164, the connector 165, and the keypad 166.

The buttons 161 may be formed on a front surface, a side surface, or a rear surface of a housing of the electronic device 100, and may include at least one of a power/lock button (not shown), a volume button (not shown), a menu button, a home button, a back button, and a search button 161.

The microphone 162 receives voices or sounds to generate electric signals under the control of the controller 110.

The speaker 163 may output sounds corresponding to various signals (for example, a wireless signal, a broadcasting signal, a digital audio file, a digital video file, or photography) of the mobile communication module 120, the sub-communication module 130, the multimedia module 140, or the camera module 150, to the outside under the control of the controller 110. The speaker 163 may output sounds (for example, a button operation tone corresponding to a telephone call, or a call connection tone) corresponding to functions which the apparatus 100 performs. One or a plurality of speakers 163 may be formed at a proper location or locations of the housing of the apparatus 100.

The vibratory motor 164 may convert an electric signal into a mechanical vibration under the control of the controller 110. For example, when receiving a voice call from another device (not shown), the apparatus 100 in a vibratory mode operates the vibratory motor 164. One or a plurality of vibratory motors 164 may be formed in the housing of the apparatus 100. The vibratory motor 164 may operate in response to a touch of a user on the touch screen 191, and a continuous movement of a touch on the touch screen 191.

The connector 165 may be used as an interface for connecting the electronic device 100 with the external device (not shown) or a power source (not shown). The electronic device 100 may transmit data stored in the storage unit 175 of the electronic device 100 to the external device (not shown), or may receive data from the external device (not shown) through a wired cable connected to the connector 165 under the control of the controller 110. Moreover, the electronic device 100 may receive an electric power from the power source (not shown) through the wired cable connected to the connector 165, or may charge a battery (not shown) by using the power source.

The keypad 166 may receive a key input from the user for the control of the apparatus 100. The keypad 166 includes a physical keypad (not shown) formed in the electronic device 100, or a virtual keypad (not shown) displayed on the touch screen 191. The physical keypad formed in the electronic device 100 may be excluded according to the performance or the structure of the electronic device 100.

An earphone may be inserted into the earphone connecting jack 167 to be connected to the electronic device 100.

The pen detaching recognition switch 169 is installed at an area into which the stylus pen 168 is inserted, such that the stylus pen 168 directly or indirectly contacts the pen detaching recognition switch 169 when being mounted to the area. For example, the pen detaching recognition switch 169 may have a boss protruding to a space into which the stylus pen 168 is inserted, for contacting with the stylus pen 168, and in addition, the boss may be formed such that a resilient force is applied to the space into which the stylus pen 168 is inserted.

Through such a configuration as described above, when the stylus pen 168 is mounted to the electronic device 100, the boss formed in the pen detaching recognition switch 169 is pressed by the stylus pen 168 to maintain contact with the stylus pen 168, and when the stylus pen 168 is extracted and detached from the portable terminal 100, the boss protrudes to the space into which the stylus pen 168 is inserted. Accordingly, the pen detaching recognition switch 169 generates and provides a signal for instructing of detachment or attachment of the stylus pen 168, according to whether or not the boss protrudes to the space into which the stylus pen 168 is inserted, or whether or not the boss is pressed by the stylus pen 168.

The sensor module 170 includes at least one sensor for detecting the state of the electronic device 100. For example, the sensor module 170 may include a proximity sensor for detecting a user's access to the apparatus 100, an illumination sensor (not shown) for detecting a quantity of light around the electronic device 100, a motion sensor (not shown) for detecting motion (for example, rotation of the electronic device 100, and acceleration or vibration applied to the electronic device 100) of the apparatus 100, a geomagnetic sensor (not shown) for detecting a point of a compass by using earth's magnetic field, a gravity sensor for detecting a direction of gravity, and an altimeter for detecting an altitude by measuring atmospheric pressure. At least one sensor may detect the state, generate a signal corresponding to the detection, and transmit the signal to the controller 110. The sensor of the sensor module 170 may be added or omitted according to the performance of the electronic device 100.

The storage unit 175 may store the signal or the data, which is input and output to correspond to operations of the mobile communication module 120, the sub-communication module 130, the multimedia module 140, the camera module 150, the GPS module 155, the input/output module 160, the sensor module 170, and the touch screen 191, under the control of the controller 110. The storage unit 175 may store control programs for the control of the electronic device 100 or the controller 110, or applications.

The term referred to as "storage unit" is used with the meaning including the storage unit 175, the ROM 112 and the RAM 113 in the controller 110, or a memory card (not shown) (for example, an SD card, and a memory stick) which is mounted to the apparatus 100. The storage unit may include a nonvolatile memory, a volatile memory, a hard disk drive (HDD), or a solid state drive (SSD).

The power supply unit 180 may supply an electric power to one or a plurality of batteries (not shown) disposed in the housing of the electronic device 100. The one or the plurality of batteries (not shown) supplies the electric power to the electronic device 100. Moreover, the power supply unit 180 may supply the electric power, which is input from an external power source (not shown) through the wired cable connected with the connector 165, to the electronic device 100. Furthermore, the power supply unit 180 may also supply the electric power, which is input in a wireless manner from the external power source through a wireless charging technology, to the electronic device 100.

The touch screen 191 may provide user interfaces corresponding to various services (for example, telephone calls, data transmission, broadcasting, and photography) to the user. The touch screen 191 may transmit an analog signal, corresponding to at least one touch which is input to the user interface, to the touch screen controller 192. The touch screen 191 may receive the at least one touch through the user's body (for example, fingers including a thumb), or a touchable input means (for example, a stylus pen). Moreover, the touch screen 191 may receive a continuous movement of the at least one touch. The touch screen 191 may transmit an analog signal corresponding to the continuous movement of the input touch to the touch screen controller 192.

Furthermore, in the present invention, the touch is not limited to the contact between the touch screen 191 and the user's body or the touchable input means, and the touch may include noncontact (for example, a detectable interval between the touch screen 191 and the user's body or the touchable input means is smaller than or equal to 1 mm). The detectable interval on the touch screen 191 may be changed according to the performance or the structure of the electronic device 100, and in particular, in order to distinguishably detect a touch event by the contact between the touch screen 191 and the user's body or the touchable input means, and a noncontact input (for example, hovering) event, the touch screen 191 is formed such that the values (for example, current values) detected by the touch event and the hovering event may be differently output. Moreover, preferably, the touch screen 191 differently outputs the detected value (for example, the current value) according to the distance between the space where the hovering event is generated and the touch screen 191.

For example, the touch screen 191 may be realized in a resistive manner, a capacity manner, an infrared manner, or an acoustic wave manner.

Meanwhile, the touch screen controller 192 converts the analog signal received from the touch screen 191 to a digital signal (for example, X and Y coordinates), and then transmits the digital signal to the controller 110. The controller 110 may control the touch screen 191 by using the digital signal received from the touch screen controller 192. For example, the controller 110 may allow a shortcut icon (not shown), displayed on the touch screen 191 in response to the touch event or the hovering event, to be selected, or may execute the shortcut icon. Moreover, the touch screen controller 192 may also be included in the controller 110.

In addition, the touch screen controller 192 may detect the value (for example, the current value) output through the touch screen 191 to identify the distance between the space where the hovering event is generated and the touch screen 191, and may covert the identified distance value into a digital signal (for example, Z coordinate) to provide the digital signal to the controller 110.

Moreover, the touch screen 191 may include at least two touch screen panels capable of separately sensing the touch or the proximity of the user's body and the touchable input means to simultaneously receive inputs by the user's body and the touchable input means. The two touch screen panels provide different output values to the touch screen controller 192, and the touch screen controller 192 differently recognize the values input from the at least two touch screen panels, thereby identifying whether or not the inputs from the touch screens correspond to the input by the user's body, or the input by the touchable input means.

The display unit 193 may be formed of a display device such as a liquid crystal display (LCD) device, and an active matrix organic light emitting diode (AM OLED), and is disposed above or below a location where the touch screen 191 is installed.

The display controller 194 receives data generated according to the driving of the application as well as messages for various operation states which are provided from the controller 110, converts them to signals which may be displayed on the display unit 193, and provides the signals the display unit 193.

Figure 2:
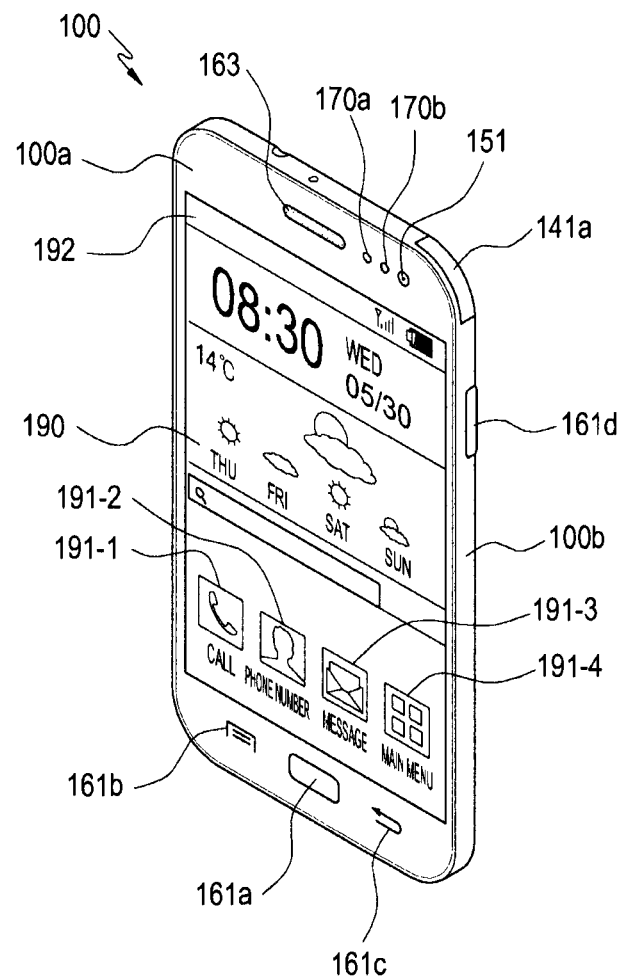
FIG. 2 is a front perspective view showing a portable terminal according to an embodiment of the present invention.
Figure 3:
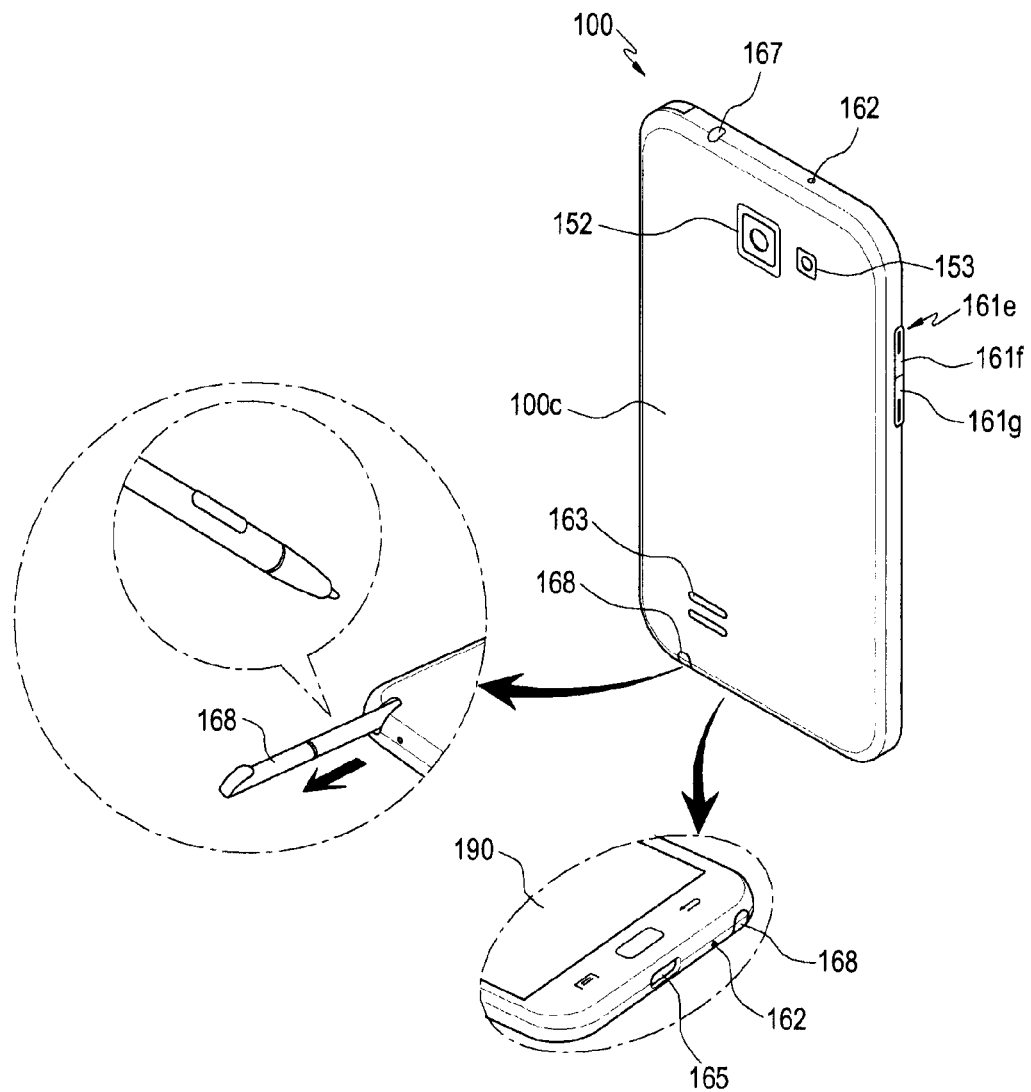
FIG. 3 is a rear perspective view showing a portable terminal according to an embodiment of the present invention.

FIG. 2 is a front perspective view showing a portable terminal according to an embodiment of the present invention. FIG. 3 is a rear perspective view showing a portable terminal according to an embodiment of the present invention.

Referring to FIG. 2, a touch screen 191 is disposed at a central area of a front surface 100a of an apparatus 100. The touch screen 191 is largely formed to occupy most of the front surface 100a of the apparatus 100. FIG. 2 shows an embodiment in which a main home picture is displayed on the touch screen 191. The main home picture corresponds to a first picture displayed on the touch screen 191, when the power source of the apparatus 100 is turned on. Moreover, in a case in which the apparatus 100 has several pages of different home pictures, the main home picture may correspond to a first home picture of the several pages of home pictures. Shortcut icons 191-1, 191-2, and 191-3 for executing frequently used applications, a main menu converting key 191-4, a time, and weather may be displayed in the home picture. The main menu converting key 191-4 allows displaying of a menu picture on the touch screen 191. Furthermore, a status bar 192 for displaying a state of the apparatus 100 such as a battery charging state, an intensity of a received signal, and a current time may be formed at an upper end portion of the touch screen 191.

A home button 161a, a menu button 161b, and a back button 161c may be formed at a lower portion of the touch screen 191.

The home button 161a allows displaying of the main home picture on the touch screen 191. For example, when the home button 161a is touched in a state where the main home picture, and another home picture or the menu picture are displayed on the touch screen 191, the main home picture may be displayed on the touch screen 191. Moreover, when the home button 161a is touched, while the applications are executed on the touch screen 191, the main home picture shown in FIG. 2 may be displayed on the touch screen 191. Furthermore, the home button 161a may be used to allow displaying of the recently used applications or a task manager on the touch screen 191.

The menu button 161b provides a connection menu which may be used on the touch screen 191. The connection menu may include a widget addition menu, a background image change menu, a search menu, an edition menu, and an environment setup menu.

The back button 161c may allow displaying of the picture executed shortly before the currently executed picture, or may terminate the application which is most recently used.

A first camera 151, an illumination sensor 170a, and a proximity sensor 170b may be disposed at an upper edge portion of the front surface 110a of the apparatus 100. A second camera 152, a flash 153, and a speaker 163 may be disposed on a rear surface 100c of the apparatus 100.

For example, a power/reset button 160a, a volume button 161b, a ground wave DMB antenna for receiving of broadcasts, and one or a plurality of microphones 162 may be disposed on side surface 100b of the apparatus 100. The DMB antenna 141a may be fixed to the apparatus 100, or may be detachably formed.

Moreover, a connector 165 is formed on a lower side surface of the apparatus 100. A plurality of electrodes is formed in the connector 165, and may be connected with the external device in the wired manner. An earphone jack 167 may be formed on an upper side surface of the apparatus 100. An earphone may be inserted into the earphone jack 167.

A stylus pen 168 may be provided on the lower side surface of the apparatus 100. The stylus pen 168 may be inserted into the apparatus 100 to be kept, and may be extracted from the apparatus 100 to be detached for use.

Figure 4:
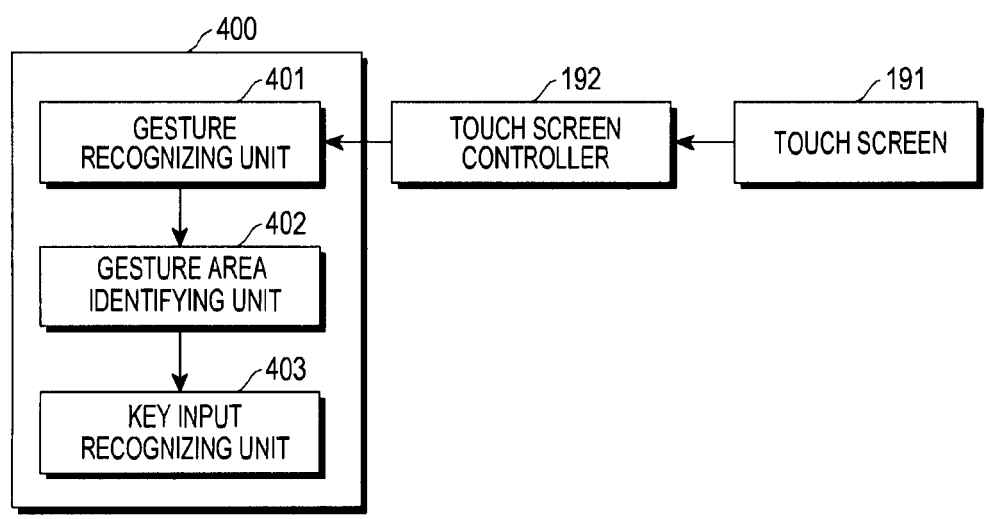
FIG. 4 is a block diagram showing detailed configurations of a key input control apparatus according to an embodiment of the present invention.

In particular, the above-described controller 110 installed in the portable terminal according to the embodiment of the present invention is configured to perform a key input control method according to an embodiment of the present invention. To this end, as shown in FIG. 4, the controller 110 installed in the present invention includes a key input control device 400 which includes a gesture recognizing unit 401, a gesture area identifying unit 402, and a key input recognizing unit 403.

As at least one touch is input on the touch screen 191 through a user's body (for example, fingers including a thumb), or a touchable input means (for example, a stylus pen), the touch screen 191 transfers an analog signal corresponding to the at least one touch to the touch screen controller 192, and the touch screen controller 192 converts the analog signal into a digital signal (for example, X and Y coordinates), and transfers the digital signal to the gesture recognizing unit 401 included in the controller 110. Then, the gesture recognizing unit 401 identifies an area where the at least one touch is input. That is, the gesture recognizing unit 401 stores data for the area until the at least one touch is released, and identifies whether or not the stored data coincides with a predetermined specific gesture.

In more detail, the predetermined gesture may correspond to a drag input having a predetermined first length or longer, or may correspond to an input which has a predetermined second length or longer, and is dragged to an area to which a specific hardware key is allotted or assigned (or an input where a key input, generated at an area to which a specific hardware key is allotted, is dragged by the predetermined second length or longer). In addition, the predetermined first length may be set to be large relative to the predetermined second length.

Figure 5:
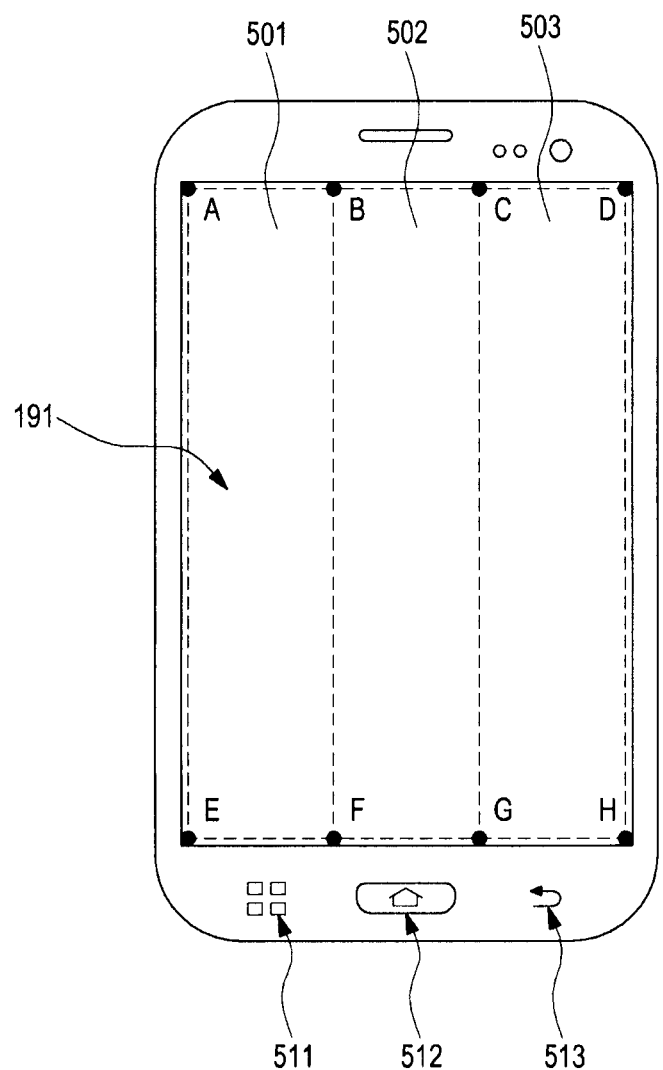
FIG. 5 shows an illustrative example of predetermined areas used in a key input control apparatus according to an embodiment of the present invention.

The gesture area identifying unit 402 identifies which area of predetermined areas the gesture input detected in the gesture recognizing unit 401 is generated at. For example, the predetermined areas may be illustrated as shown in FIG. 5. That is, as hardware input keys 511, 512, and 513 are provided in the portable terminal 100, a first area 501, a second area 502, and a third area 503 may be set. The first area 501, the second area 502, and the third area 503 are set by dividing lengthwise the area of the touch screen 191 by the total number corresponding to the hardware input keys (the first key 511, the second key 512, and the third key 513), and are set to correspond to the locations of the hardware input keys (the first key 511, the second key 512, and the third key 513), respectively. For example, the first area 501 may be set as an area between points A, B, E, and F, the second area 502 may be set as an area between points B, C, F, and G, and the third area 503 may be set as an area between points C, D, G, and H.

Although the predetermined areas are set by dividing lengthwise the area of the touch screen 191 by the number corresponding to the hardware input keys in the above-described embodiment of the present invention, the present invention is not limited thereto. The predetermined areas may be set by dividing lengthwise the touch area of the touch screen 191 irrespective of the total number of the hardware input keys, and may be set by dividing the touch area of the touch screen 191 into at least two areas.

The key input recognizing unit 403 identifies the hardware key allotted to the predetermined area (one of the first, the second, and the third areas 501, 502, and 503) where the gesture input is generated, recognizes the input corresponding to the identified hardware key, and performs an operation allotted to the corresponding key. For example, the hardware keys allotted to the predetermined areas (the first, the second, and the third areas 501, 502, and 503), respectively, may be set as shown in Table 1 below.

TABLE 1

| Area | Hardware key |
| --- | --- |
| First area | First key (Menu key) |
| Second area | Second key (Home key) |
| Third area | Third key (Back key) |
| . | . |
| . | . |
| . | . |

The first key 511 may correspond to a menu key, the second key may correspond to a home key, and the third key 513 may correspond to a back key.

Moreover, although the hardware keys allotted to the predetermined areas, respectively, are illustrated through Table 1, it is apparent that the present invention is not limited thereto, and various modifications can be made according to the object desired to be achieved through an apparatus and a method for controlling a key input according to the present invention.

FIGS. 6A to 8D show examples of a hardware key input by a key input control apparatus according to an embodiment of the present invention. FIGS. 6A to 6D show embodiments in which an input of a first key is recognized, FIGS. 7A to 7D show embodiments in which an input of a second key is recognized, and FIGS. 9A to 9D show embodiments in which an input of a third key is recognized.

Figure 6A:
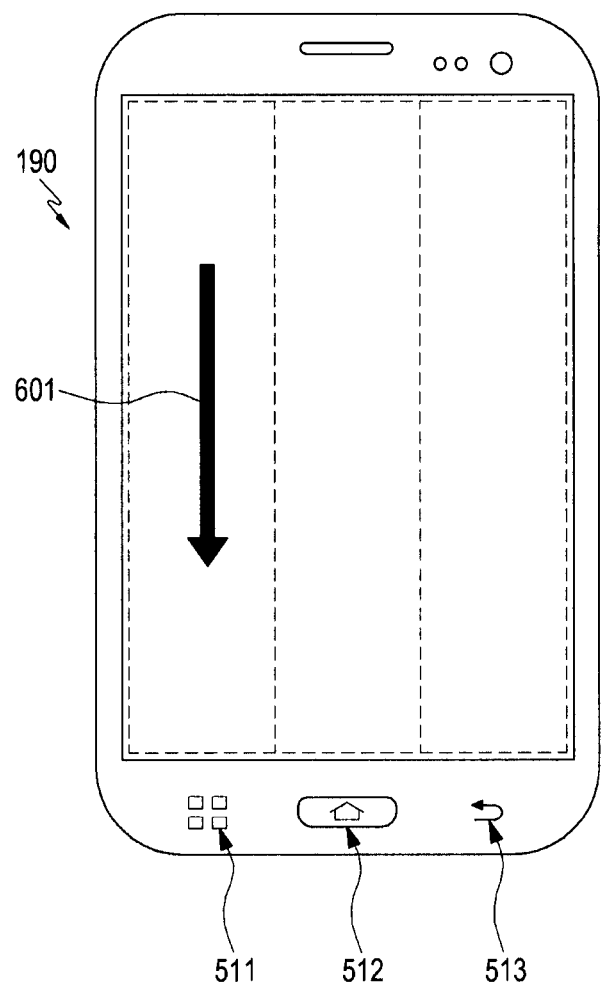
FIG. 6A, FIG. 6B, FIG. 6C, FIG. 6D, FIG. 7A, FIG. 7B, FIG. 7C, FIG. 7D, FIG. 8A, FIG. 8B, FIG. 8C and FIG. 8D show illustrative examples of a hardware key input by a key input control apparatus according to an embodiment of the present invention.
Figure 6B:
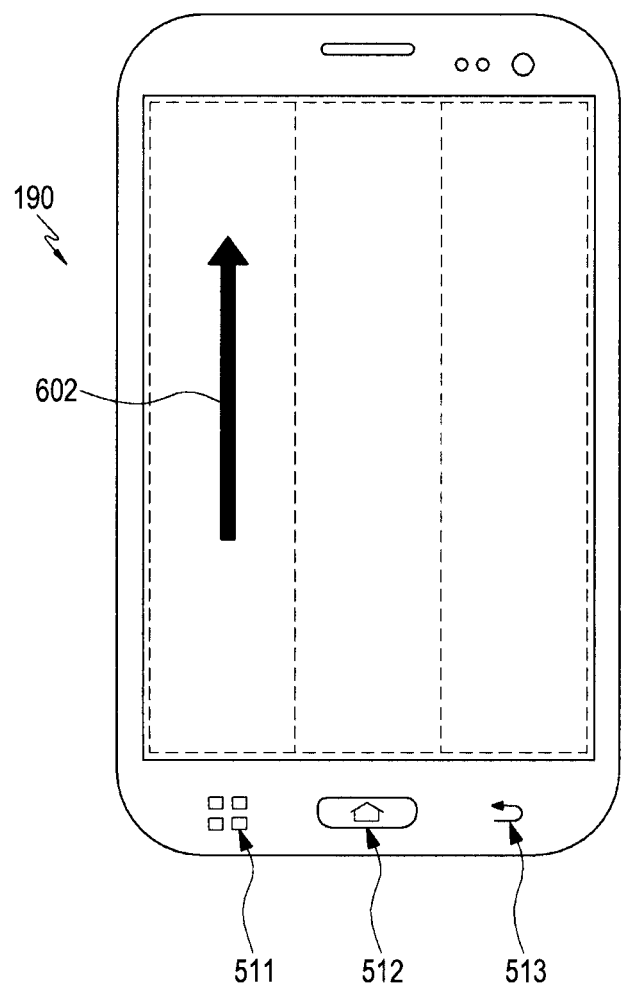
Figure 6C:
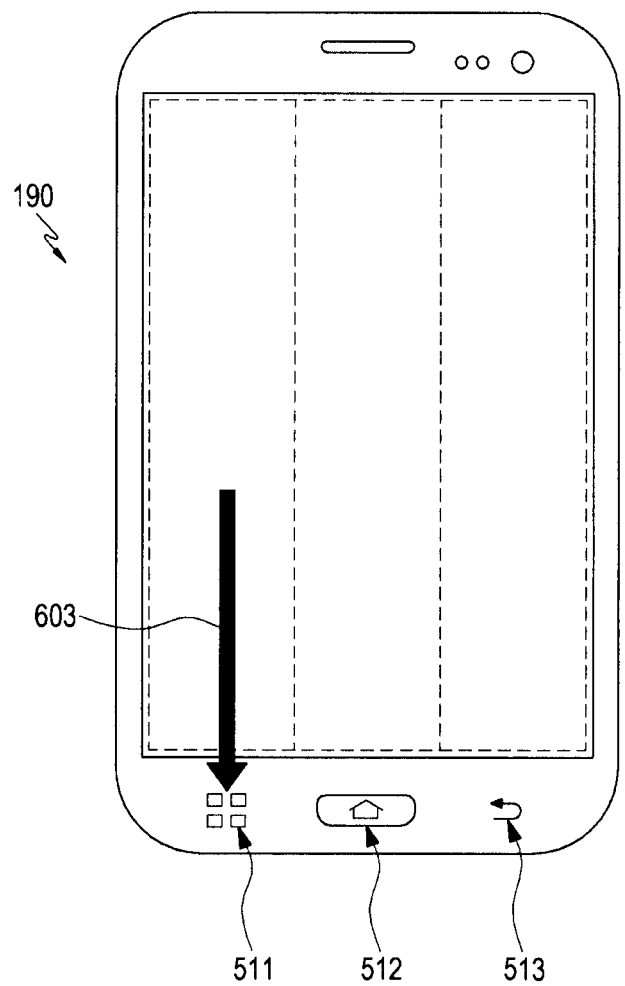
Figure 6D:
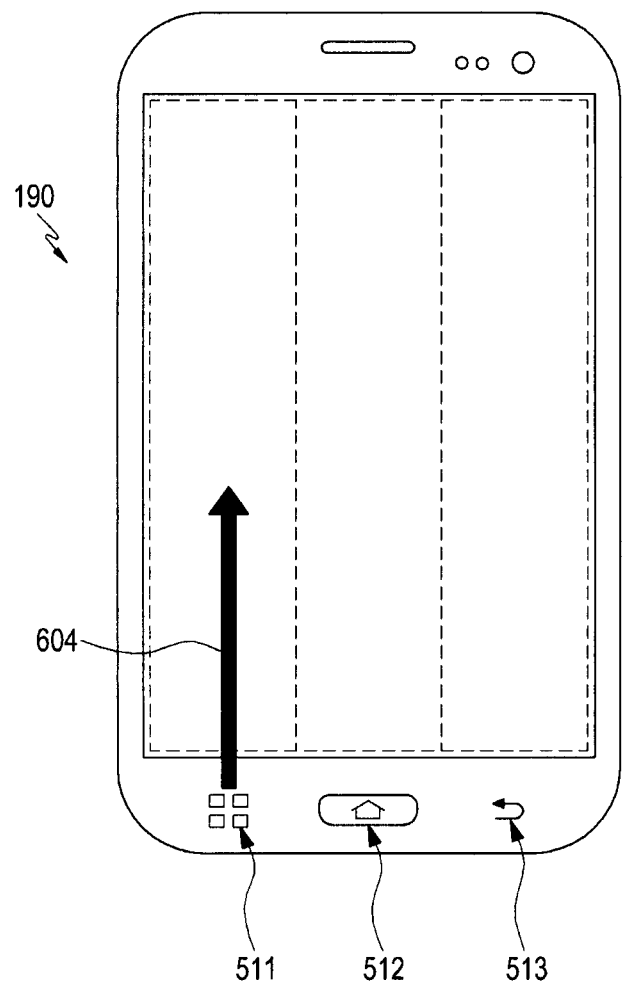

FIG. 6A shows an embodiment in which, as a drag having a predetermined first length or longer is input at a first area in a direction to a first key, an input of the first key (a menu key) is recognized, FIG. 6B shows an embodiment in which, as a drag having a predetermined first length or longer is input at the first area in a direction opposite to the first key, the input of the first key (the menu key) is recognized, FIG. 6C shows an embodiment in which, as a drag having a predetermined second length or longer is input from an inner part of the first area to an outer part of the first area corresponding to the first key, the input of the first key (the menu key) is recognized, and FIG. 6D shows an embodiment in which, as a drag having a predetermined second length or longer is input from the outer part of the first area corresponding to the first key to the inner part of the first area, the input of the first key (the menu key) is recognized.

Figure 7A:
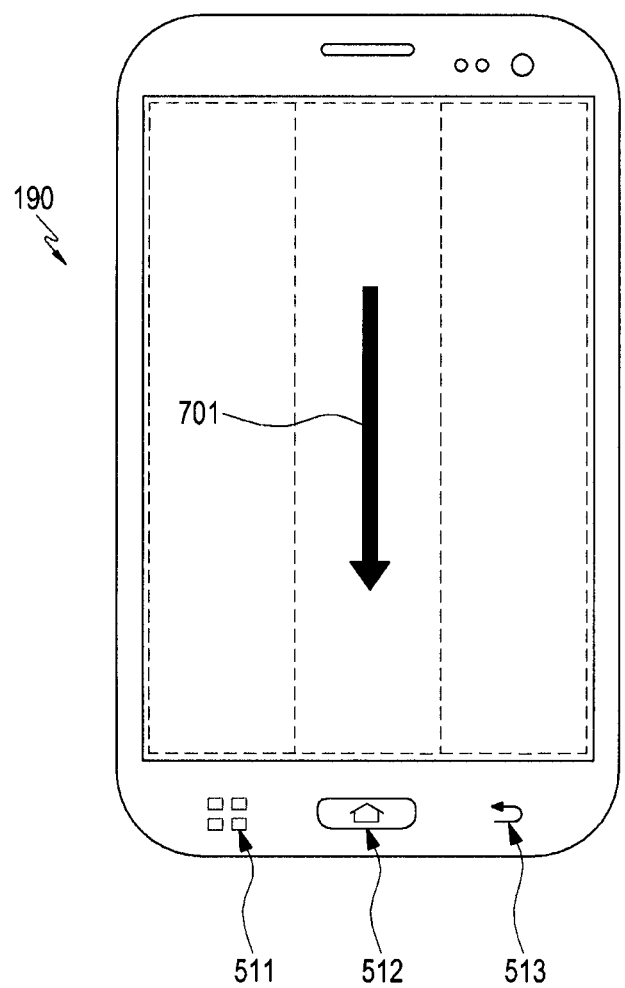
Figure 7B:
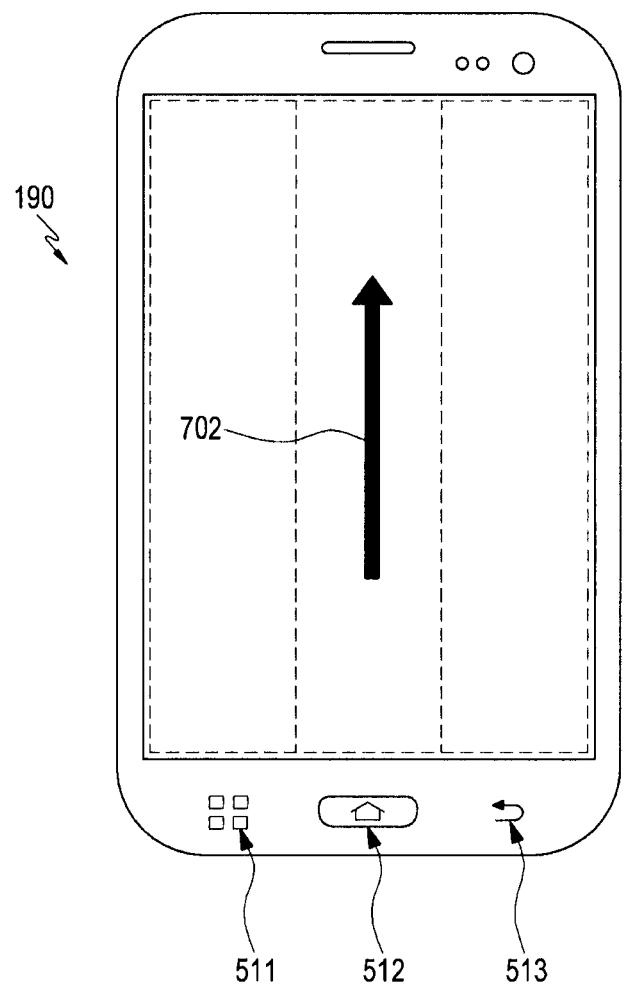
Figure 7C:
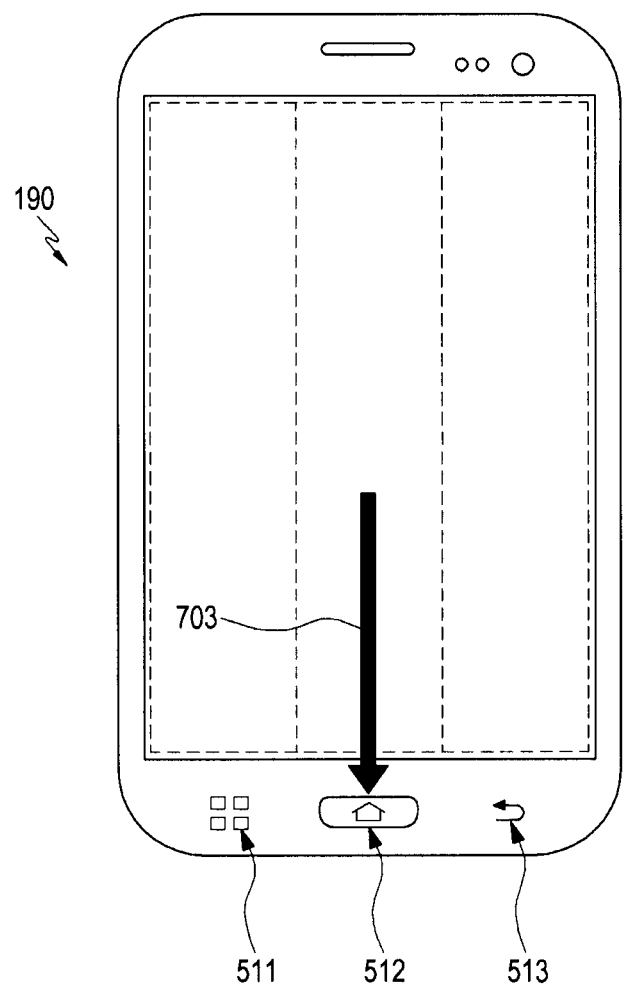
Figure 7D:
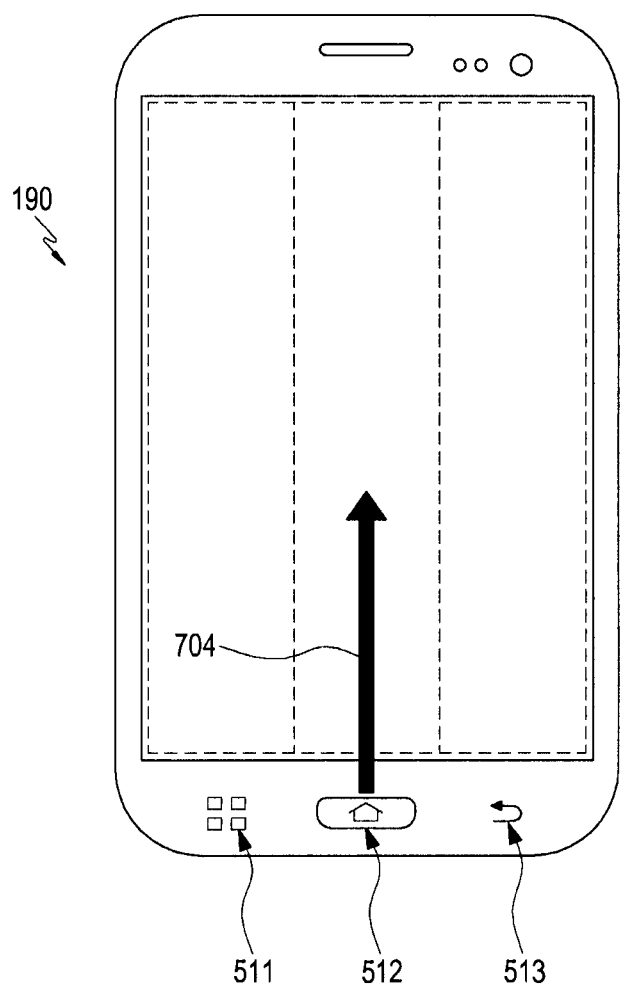

Similarly, FIG. 7A shows an embodiment in which, as a drag having a predetermined first length or longer is input at a second area in a direction to a second key, an input of the second key (a home key) is recognized, FIG. 7B shows an embodiment in which, as a drag having a predetermined first length or longer is input at the second area in a direction opposite to the second key, the input of the second key (the home key) is recognized, FIG. 7C shows an embodiment in which, as a drag having a predetermined second length or longer is input from an inner part of the second area to an outer part of the second area corresponding to the second key, the input of the second key (the home key) is recognized, and FIG. 7D shows an embodiment in which, as a drag having a predetermined second length or longer is input from the outer part of the second t area corresponding to the second key to the inner part of the second area, the input of the second key (the home key) is recognized.

Figure 8A:
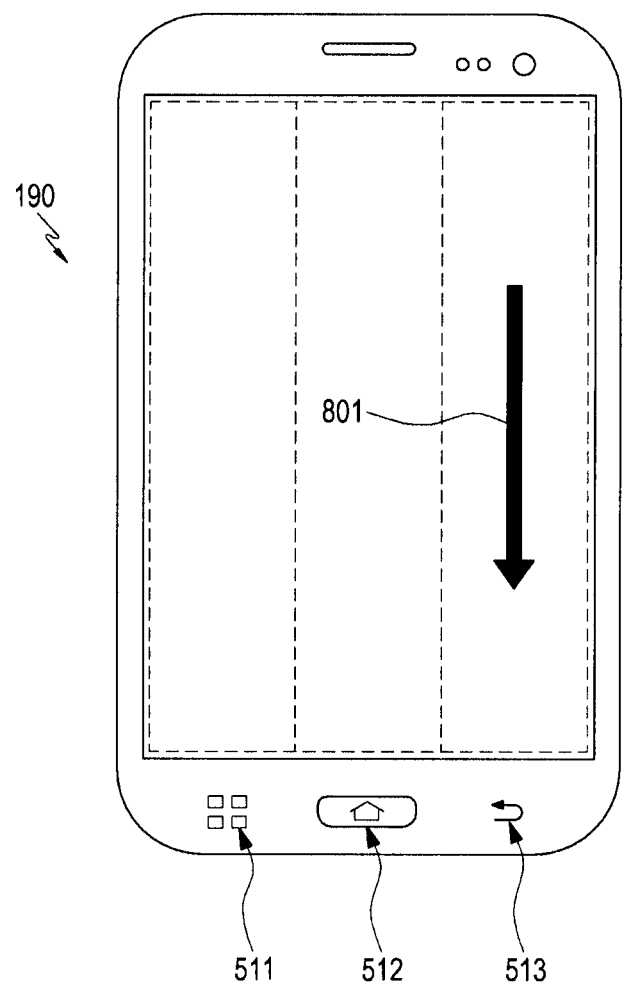
Figure 8B:
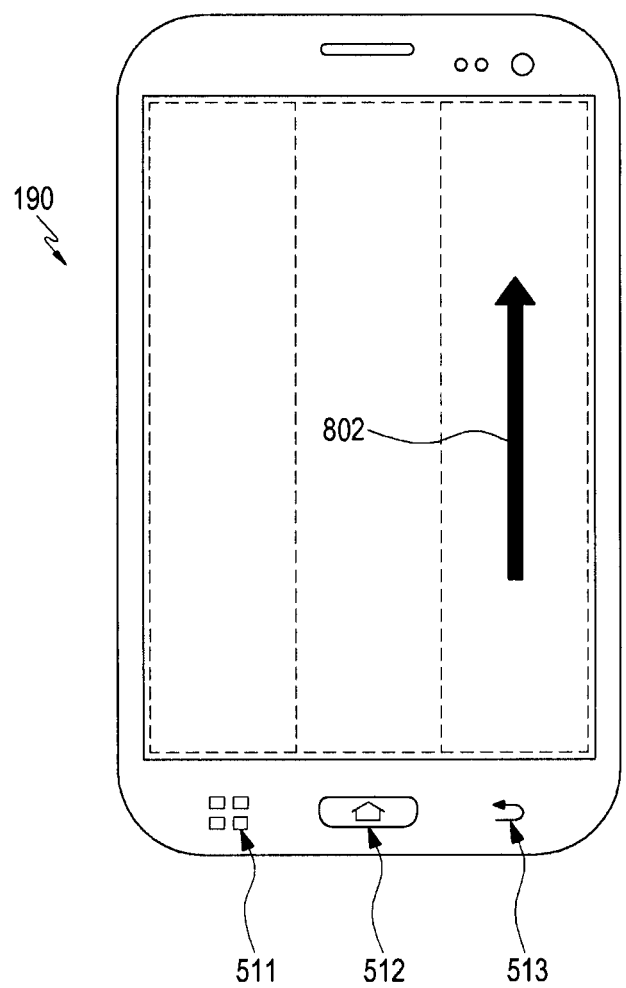
Figure 8C:
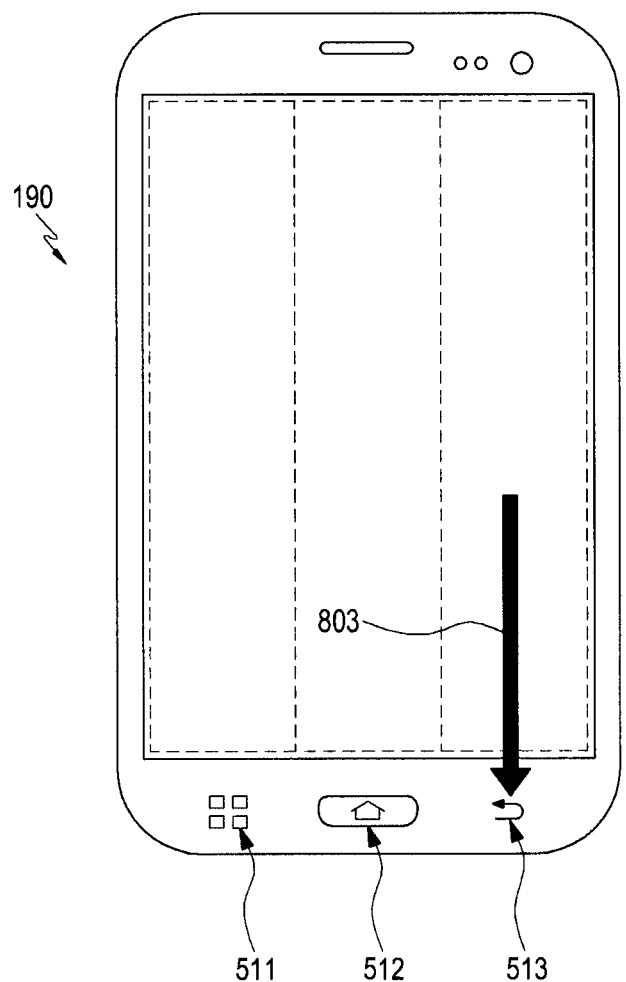
Figure 8D:
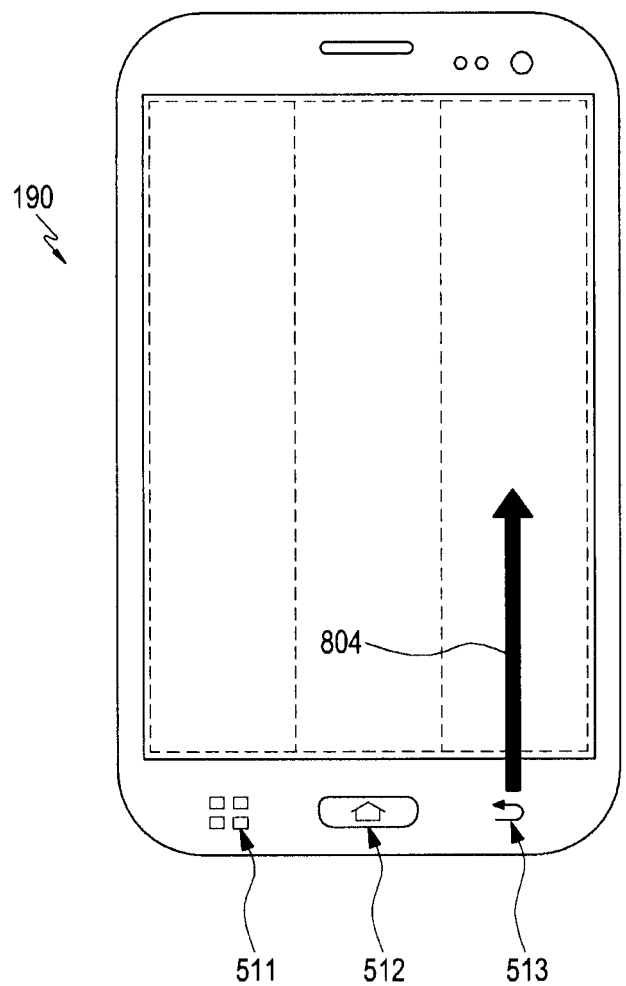
Figure 9:
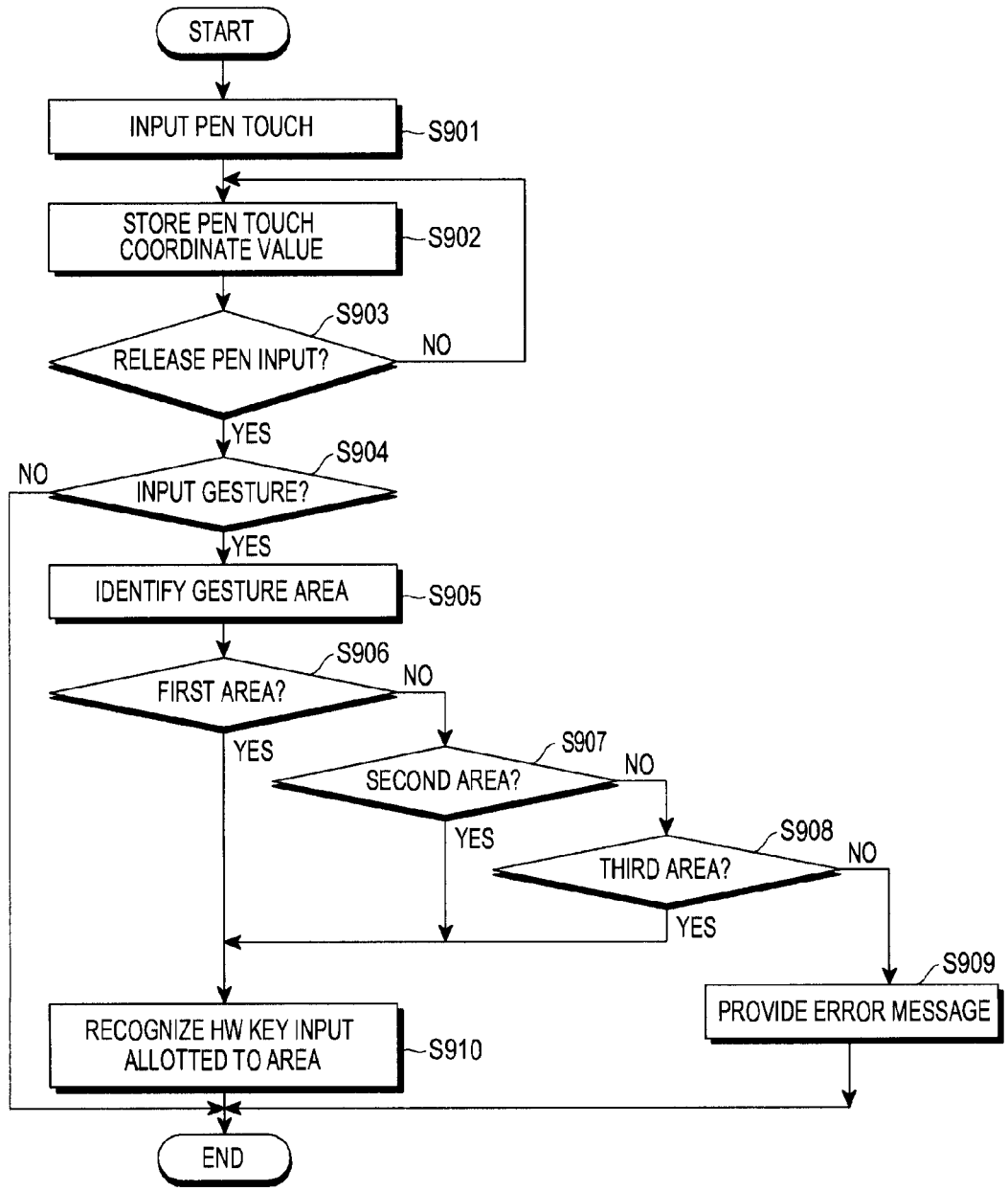
FIG. 9 is a flowchart showing a process of performing a key input control method according to an embodiment of the present invention.

Likewise, FIG. 8A shows an embodiment in which, as a drag having a predetermined first length or longer is input at a third area in a direction to a third key, an input of the third key (a back key) is recognized, FIG. 8B shows an embodiment in which, as a drag having a predetermined first length or longer is input at the third area in a direction opposite to the third key, the input of the third key (the back key) is recognized, FIG. 8C shows an embodiment in which, as a drag having a predetermined second length or longer is input from an inner part of the third area to an outer part of the third area corresponding to the third key, the input of the third key (the back key) is recognized, and FIG. 8D shows an embodiment in which, as a drag having a predetermined second length or longer is input from the outer part of the third area corresponding to the third key to the inner part of the third area, the input of the third key (the back key) is recognized. FIG. 9 is a flowchart showing a process of performing a key input control method according to an embodiment of the present invention.

Referring to FIG. 9, as at least one touch is input on the touch screen 191 through a user's body (for example, fingers) or a touchable input means (for example, a stylus pen), the touch screen 191 transfers an analog signal corresponding to the at least one touch to the touch screen controller 192, and the touch screen controller 192 converts the analog signal into a digital signal (for example, X and Y coordinates), and transfers the digital signal to the gesture recognizing unit 401 included in the controller 110. Accordingly, the gesture recognizing unit 401 receives information on an area where the at least one touch is input (S901), and stores the information on the area where the at least one touch is input (S902).

In this way, the operations (S901, and S902) for receiving and storing the information on the area where the at least one touch is input are repeatedly performed until the at least one touch is released (S903).

When the at least one touch is released, the gesture recognizing unit 401 identifies whether or not the touch input shows a pattern corresponding to a predetermined gesture, by using the information stored through steps S901 and S902. For example, the predetermined gesture may correspond to a drag input having a predetermined first length or longer, or may correspond to an input which has a predetermined second length or longer and is dragged to an area to which a specific hardware key is allotted (or an input where a key input, generated at an area to which a specific hardware key is allotted, is dragged by the predetermined second length or longer), and the gesture recognizing unit 401 identifies whether or not the touch input has a pattern corresponding to the predetermined gesture, in view of the predetermined gesture.

When the touch input has the pattern corresponding to the predetermined gesture (S904—Yes), the gesture recognizing unit 401 instructs the gesture area identifying unit 402 to operate. Accordingly, the gesture area identifying unit 402 identifies which area of the predetermined areas the gesture input identified in the gesture recognizing unit 401 is generated at (S905). As shown in FIG. 5, the predetermined areas may be illustrated as a first, a second, and a third areas 501, 502, and 503, and may be set with respect to the hardware input keys 511, 512, and 513 included in the portable terminal 100.

Thus, the gesture area identifying unit 402 performs an operation for identifying which area of the first, the second, and the third areas 501, 502, and 503 the gesture input is generated at (S906, S907, and S908), and when the gesture input is not generated at one area of the first, the second, and the third areas 501, 502, and 503, and deviates from one area (S908—No), an error message for the gesture input is displayed on the display (S909).

Meanwhile, in step 910, the key input recognizing unit 403 identifies the hardware keys which are allotted or assigned to the predetermined areas (the first, the second, and the third area 501, 502, and 503), respectively, recognizes inputs corresponding to the identified hardware keys, and performs an operation allotted to the corresponding key. For example, since the hardware keys allotted to the predetermined areas (the first, the second, and the third area 501, 502, and 503), respectively, are illustrated as shown in Table 1, when a generation area of the gesture input identified through steps S906, S907, and S908 corresponds to the first area, the input corresponding to the first key 511 (Menu key) is recognized so that the operation corresponding to the first key 511 (Menu key) is performed, when the generation area corresponds to the second area, the input corresponding to the second key 512 (Home key) is recognized so that the operation corresponding to the second key 512 (Home key) is performed, and when the generation area corresponds to the third area, the input corresponding to the third key 513 (Back key) is recognized so that the operation corresponding to the third key 513 (Back key) is performed.

Moreover, although the hardware keys allotted to the predetermined areas (the first, the second, and the third area 501, 502, and 503), respectively, are illustrated as shown in Table 1, it is apparent that the present invention is not limited thereto, and various modifications can be made according to the things desired to be achieved through the apparatus and the method for controlling the key input according to the present invention.

According to the embodiments of the present invention, the inputs of the hardware keys can be intuitively performed, without the hardware keys included in the portable terminal being pressed or touched.

Moreover, according to the embodiments of the present invention, while the screen of the portable terminal is touched by the user's body (for example, fingers) or the touchable input medium, even if the user's body (for example, fingers) or the touchable input medium is not moved to the area where the hardware keys are provided, the hardware keys can be more simply input.

The above-described methods according to the present invention can be implemented in hardware, firmware or via the execution of software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Under the broadest reasonable interpretation, the appended claims constitute statutory subject matter in compliance with 35 U.S.C. §101. The definition of the terms "unit" or "module" as referred to herein is to be understood as constituting hardware circuitry such as a processor or microprocessor configured for a certain desired functionality, or a communication module containing hardware such as transmitter, receiver or transceiver, or a non-transitory medium comprising machine executable code that is loaded into and executed by hardware for operation, in accordance with statutory subject matter under 35 U.S.C. §101 and do not constitute software per se.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation and the teaching of the present invention without departing from the central scope. Therefore, it is intended that the present invention not be limited to the particular embodiment disclosed as the best mode contemplated for carrying out the present invention, but that the present invention include all embodiments falling within the scope of the appended claims.

What is claimed is:

1. An apparatus for controlling a key input of a portable terminal, comprising:
    a touch screen;
    a plurality of keys comprising hardware keys and touch keys,
        the hardware keys including at least one of a volume key and a power key,
        the touch keys including at least one of a home key, a menu key, and a back key; and
    a controller, configured to:
    detect an input of a touch event generated on the touch screen,
    identify an area among a plurality of areas of the touch screen where the input of the touch event is generated, and
    recognize a key among the plurality of keys corresponding to the area of the touch screen, and perform an operation corresponding to an input of the recognized key,
    wherein the plurality of areas of the touch screen correspond to the plurality of keys, respectively.

2. The apparatus of claim 1, wherein the controller identifies a drag input of the touch event having a predetermined first length or longer.

3. The apparatus of claim 1, wherein the controller identifies a drag input, which has a predetermined second length or longer and is dragged to an area to which the key is assigned.

4. The apparatus of claim 1, wherein the controller identifies a drag input, which has a predetermined second length or longer and is dragged from an area to which the key is assigned.

5. The apparatus of claim 1, wherein the area corresponds to one of regions divided along a lengthwise direction of the screen.

6. The apparatus of claim 1, wherein a portion of the input of the touch event is dragged outside of the screen.

7. The apparatus of claim 1, wherein the area corresponds to an area which is assigned by dividing the screen by a total number of the key.

8. The apparatus of claim 1, wherein the plurality of areas is exclusive areas for detecting the input of a touch event, and the plurality of areas are divided into each area by a number of corresponding keys for performing operations.

9. A method for controlling a key input of a portable terminal, comprising:
    detecting an input of a touch event generated on a screen of the portable terminal;
    identifying an area among a plurality of areas of the screen where the input of the touch event is generated;
    recognizing a key among a plurality of keys corresponding to the identified area of the screen,
    the plurality of keys comprising hardware keys and touch keys,
    the hardware keys including at least one of a volume key and a power key,
    the touch keys including at least one of a home key, a menu key, and a back key; and
    performing an operation corresponding to an input of the recognized key,
    wherein the plurality of areas of the screen correspond to the plurality of keys, respectively.

10. The method of claim 9, wherein the input of the touch event corresponds to a drag input of the touch event having a predetermined first length or longer.

11. The method of claim 9, wherein the input of the touch event corresponds to a drag input which has a predetermined second length or longer and is dragged to an area to which the key is assigned.

12. The method of claim 9, wherein the input of the touch event corresponds to a drag input which has a predetermined second length or longer, and is dragged from an area to which the key is assigned.

13. The method of claim 9, wherein the area corresponds to one of regions divided along a lengthwise direction of a screen.

14. The method of claim 9, wherein the area corresponds to an area which is allotted by dividing lengthwise the screen with respect to the key by a number corresponding to the key.

15. The method of claim 9, wherein the plurality of areas is exclusive areas for detecting the input of a touch event, and the plurality of areas are divided into each area by a number of corresponding keys for performing operations.

16. The method of claim 9, wherein a portion of the input of the touch event is dragged outside of the screen.

17. The method of claim 9, wherein the area corresponds to an area which is assigned by dividing the screen by a total number of the key.

* * * * *